United States Patent [19]

Shindou

[11] Patent Number: 4,694,209
[45] Date of Patent: Sep. 15, 1987

[54] MOVING ELEMENT BODY APPARATUS OF LINEAR MOTOR AND METHOD FOR PRODUCING IT

[75] Inventor: Norikazu Shindou, Kanagawa, Japan

[73] Assignee: Tokyo Juki Industrial Co., Ltd., Chofu, Japan

[21] Appl. No.: 743,024
[22] PCT Filed: Oct. 19, 1984
[86] PCT No.: PCT/JP84/00498
 § 371 Date: Jun. 6, 1985
 § 102(e) Date: Jun. 6, 1985
[87] PCT Pub. No.: WO85/01843
 PCT Pub. Date: Apr. 25, 1985

[30] Foreign Application Priority Data

Oct. 19, 1983 [JP] Japan .................. 58-195419

[51] Int. Cl.⁴ .................................. H02K 41/00
[52] U.S. Cl. ............................ 310/12; 446/469
[58] Field of Search ........................ 310/12–14; 446/469

[56] References Cited

U.S. PATENT DOCUMENTS 3,648,084  3/1972  Laithwaite .................. 310/13
3,711,989  1/1973  Nielsen ....................... 446/449
4,623,807 11/1986  Nakamura ................... 310/12

FOREIGN PATENT DOCUMENTS 27143  9/1971  Japan.
135666  8/1982  Japan.

OTHER PUBLICATIONS

Patent Abstracts of Japan E-103, Apr. 23, 1982, vol. 6/No. 64 and Japanese Patent Appln. No. 55-80627, filed Jun. 13, 1980.
Dwarf High Precise Linear Motor and its Applicant, published Sep. 20, 1983.

Primary Examiner—Donovan F. Duggan
Attorney, Agent, or Firm—Tarolli, Sundheim & Covell

[57] ABSTRACT

A moving element body apparatus of a linear motor is produced by punching and processing a magnetic soft iron sheet into a large number of pole pieces formed therein with a plurality of magnetic poles having a predetermined distance therebetween, building up in layers said pole pieces into at least two pole bodies, providing said pole bodies with wheel axles, and fitting said magnetic poles of said pole bodies into openings formed in a holder plate of a nonmagnetic material for receiving said magnetic poles, thereby interconnecting securely said pole bodies and fixing said wheel axles to the pole bodies.

8 Claims, 8 Drawing Figures (a)

(b)

(c)

MOVING ELEMENT BODY APPARATUS OF LINEAR MOTOR AND METHOD FOR PRODUCING IT

TECHNICAL FIELD

The present invention relates to a moving element apparatus of a linear motor and a method for producing it.

BACKGROUND OF ART

In a prior art moving element body of a linear pulse motor, as shown in FIG. 1, pole bodies 1 and 2 connected with each other on their top surface by means of a flat plate 5 were formed on their outer ends with bearing portions 3 and 4, respectively, having a substantially U-shaped section and said bearing portions 3 and 4 were processed on the inner walls 3a and 4a so as to be parallel to the upper surface of a stator (not shown). Thereafter, axles 6 and 7 were fitted into the bearing portions 3 and 4, respectively, and fixed to them by a bonding agent.

The pole bodies 1 and 2 were made firstly by connecting a pole plates 1A and 2A with each other by a connector portion 8 and press forming them into an integral plate, and then by fixing a large number of such integral plates into a multilayered construction and fixing the flat plate 5 of, for example, magnet on the upper surface of it by a bonding agent, and finally, because of the necessity to separate the pole bodies 1 and 2 magnetically, by cutting said connector portion 8 into moving element bodies.

For this reason, the axles 6 and 7 would become fall off the bearing portions 3 and 4, respectively, because of, for example, deterioration of the bonding agent, thereby making it impossible for the moving element to move on the stator. Further, since the pole bodies 1 and 2 were connected together by the flat plate 5 on their upper surfaces only, pole teeth 1a and 2a formed on the ends of the pole bodies 1 and 2, respectively, were flexible to make the clearance between the pole teeth 1a, 2a and the stator unfixed. This presented a disadvantage of low stopping accuracy of the moving element.

Other disadvantages of the prior art linear motor moving element body were a large number of assembly steps required and a low production efficiency provided.

Accordingly, an object of the present invention is to provide a linear motor moving element and a method for producing it, capable of substantially reducing the number of assembly steps of the moving element body and increasing the stopping accuracy of the moving element.

DISCLOSURE OF INVENTION

A linear motor moving element according to the present invention is characterized in that a magnetic soft iron sheet is punched and processed into a large number of pole pieces formed therein with a plurality of magnetic poles having a predetermined distance therebetween, which are built up in layers into two or more pole bodies, thereafter the pole bodies are provided with wheel axles, and than a holder plate of a non-magnetic material having openings for receiving said magnetic poles thereinto is fitted to the magnetic poles, thereby securely interconnecting the pole bodies and fixing the wheel axles to the pole bodies.

BEST MODE FOR CARRYING OUT THE INVENTION

An embodiment of the present invention will first be described in detail with reference to the drawings.

Figure 2:
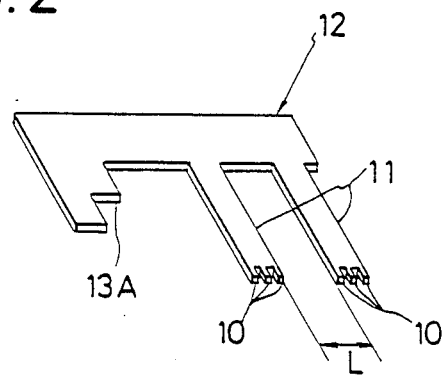
FIG. 2 is a perspective view of a pole piece according to one embodiment of the present invention.
Figure 3:
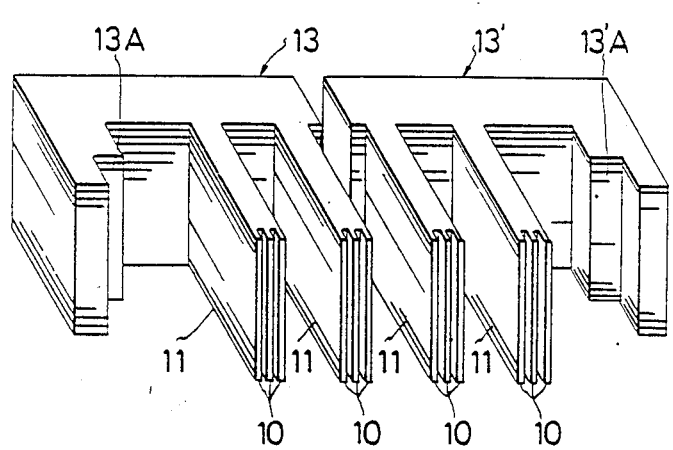
FIG. 3 is a perspective view of pole bodies according to one embodiment of the present invention.

An electromagnetic soft iron sheet finished in a uniform thickness is punched and processed by a press into a large number of poles pieces 12, as shown in FIG. 2, provided with magnetic poles 11 having pole teeth 10 at ends thereof and with a flat axle portion 13A for resting the axle thereon. The magnetic poles 11 are formed to have a distance L therebetween.

Then, a large number of degreased pole pieces 12 are built up in layers to form two separate pole bodies 13 and 13'.

Figure 1:
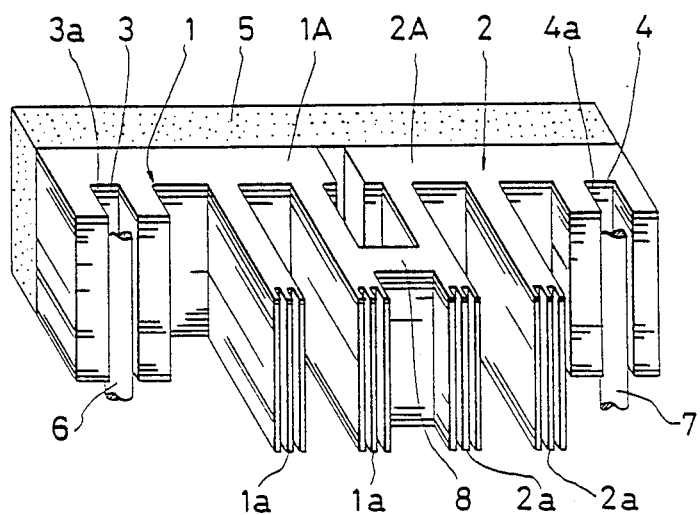
FIG. 1 is a perspective view of a prior art moving element body.

In this embodiment, unlike the prior art shown in FIG. 1, it is not necessary to connect these pole pieces 12 together by pressing the connector portions 8 to them and, accordingly, to cut these connector portions 8 away at the last step.

Steps for forming the moving element body using the pole bodies thus formed will now be described with reference to FIGS. 4(a), 4(b) and 4(c).

Figure 4:
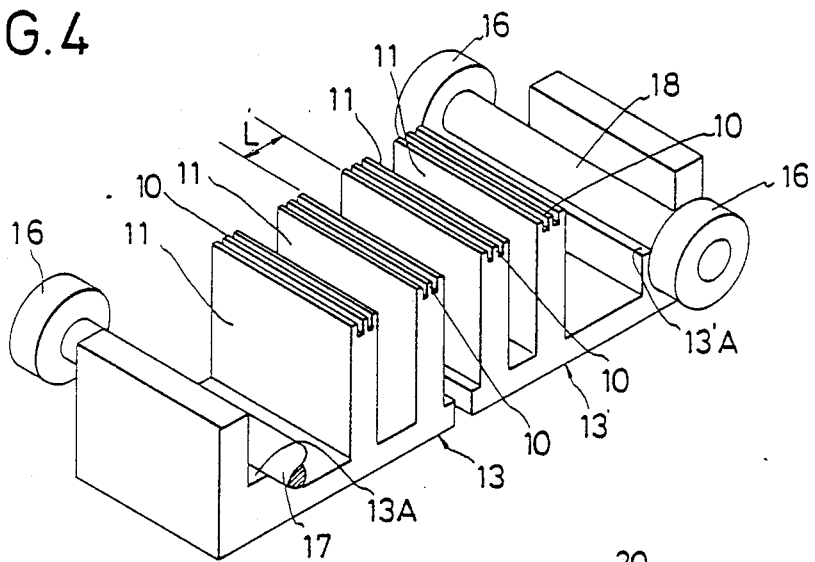
FIG. 4(a) to 4(c) are perspective views showing assembly of a moving element according to one embodiment of the present invention.
Figure 4:
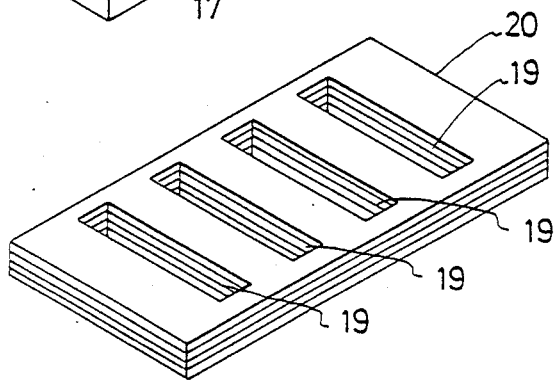
Figure 4:
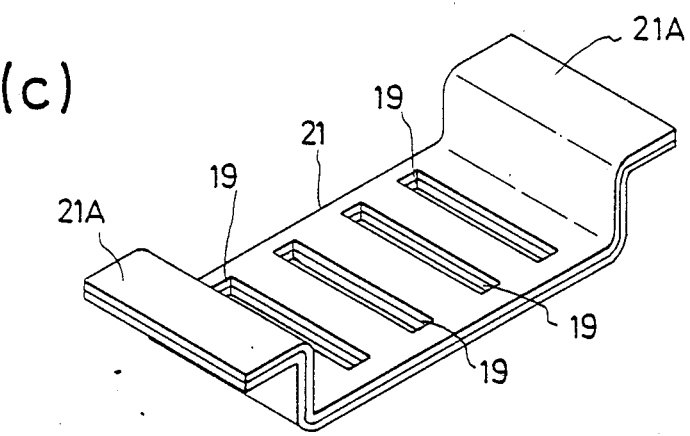

The pole bodies 13 and 13' are disposed with the distance L between the magnetic poles 11 thereof as shown in FIG. 4(a).

In this state, according to the present invention, the pole bodies 13 and 13' are connected and fixed by a holder plate 20 shown in FIG. 4(b).

The holder plate 20 is made of a non-magnetic material and formed to have openings 19 of substantially identical shape with the magnetic poles 11 and to be spaced from each other by the distance L. Accordingly, by forcibly fitting the magnetic poles 11 into the openings 19 of the holder plate 20, the pole bodies 13 and 13' are connected and fixed with each other with the magnetic poles 11 are spaced from each other by a predetermined distance (L in the illustrated embodiment). In this embodiment, therefore, it is not necessary to form the flat plate 5 as shown in FIG. 1 or to use a bonding agent.

In this state, the surfaces of the axle portions 13A and 13'A of the pole bodies 13 and 13', respectively, and the surfaces of the pole teeth 10 are polished into flat faces in parallel to the stator (not shown).

Then, axles 17 and 18 with wheels 16 secured thereto are rested on the axle portions 13A and 13'A of the pole bodies 13 and 13', respectively. In this state, in the present invention, the axles 17 and 18 are held by a holder plate 21 shown in FIG. 4(c).

The holder plate 21 is characterized by openings 19 of substantially identical shape with the magnetic poles 11 and spaced from each other by the distance L and by bent portions 21A formed at opposite ends thereof.

Accordingly, by forcibly fitting the magnetic poles 11 into the openings 19 of the holder plate 21, the pole bodies 13 and 13' are connected and fixed with each other further securely and the bent portions 21A at opposite ends of the holder plate 21 engage with the axles 17 and 18.

Figure 5:
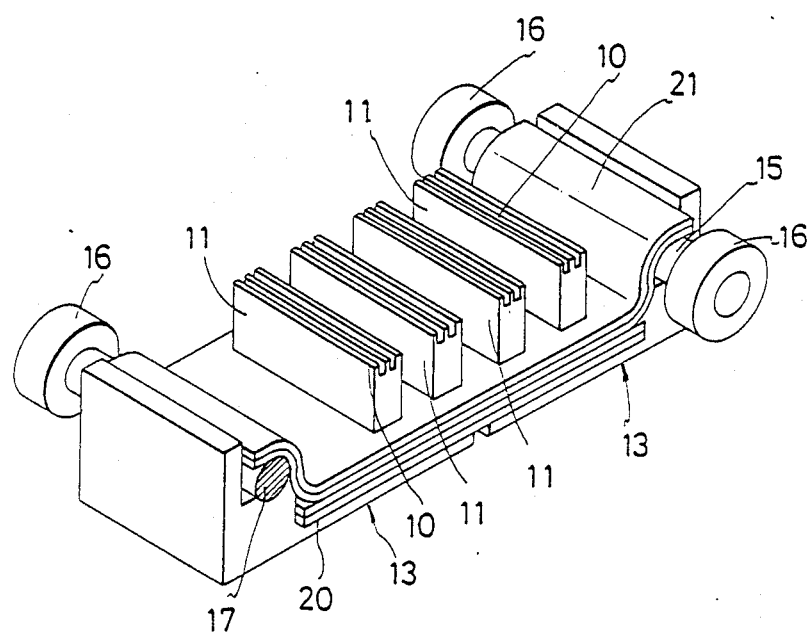
FIG. 5 is a perspective view of a moving element body apparatus according to one embodiment of the present invention.
Figure 6:
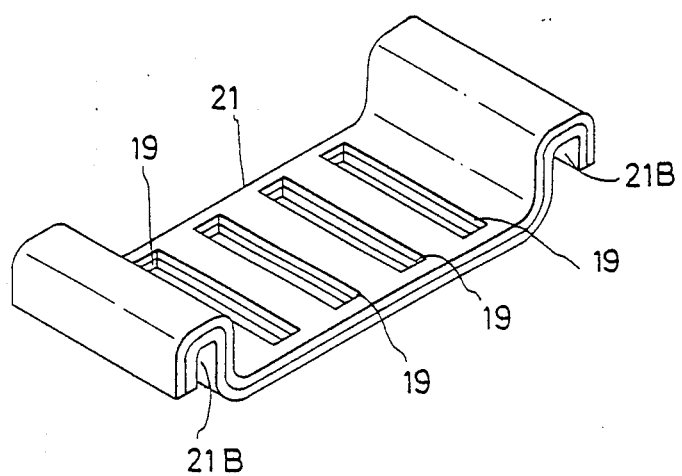
FIG. 6 is a perspective view of a holder plate according to another embodiment of the present invention.

The moving element body shown in FIG. 5 is produced by assembling the members in the manner described above.

The holder plate 21 may have, in place of the bent portions 21A, concave portions 21B at opposite ends thereof for receiving the axles 17 and 18, respectively.

INDUSTRIAL APPLICABILITY

According to the present invention, as described above, since two or more separate pole bodies have axles rested in the axle portions and then magnetic poles are fitted into openings of a holder plate of a non-magnetic material to thereby securely connect the seaprate pole bodies with each other and fix the axles to the pole bodies, it is possible to provide important meritorious effects such as substantial reduction in assembly steps of the moving element body and increase in productive efficiency.

Further, since flexibility of the magnetic poles is prevented by fitting the magnetic poles into the openings of the holder plate, other meritorious effects are provided such that a uniform clearance is maintained between the teeth at the ends of the magnetic poles and the stator and that the stopping accuracy of the moving element is increased.

I claim:

1. A movable element for use in a linear electric motor, comprising:
   a first pole body formed of a magnetizable material and having a base and a plurality of magnetic poles extending outwardly from said base, said magnetic poles being spaced apart by a predetermined distance and being magnetically interconnected by said base;
   a second pole body formed of a magnetizable material and spaced from said first pole body, said second pole body having a base and a plurality of magnetic poles extending outwardly from said base, said magnetic poles of said second pole body being spaced apart by said predetermined distance and being magnetically interconnected by the base of said second pole body; and
   holder means of a non-magnetic material for holding said first and second pole bodies in a spaced apart relationship with a first one of the magnetic poles of said first pole body spaced from a first one of the magnetic poles of the second pole body by said predetermined distance, said holder means including surface means for at least partially defining a plurality of openings spaced from each other by said predetermined distance, said first one of the magnetic poles of said first pole body extending through a first one of the openings in said holder means, said first one of the magnetic poles of said second pole body extending through a second one of the openings in said holder means, said first and second openings in said holder means being spaced apart by said predetermined distance to enable said holder means to hold said pole bodies with said first magnetic pole of said first pole body spaced from said first magnetic pole of said second pole body by said predetermined distance.

2. A movable element for use in a linear electric motor as set forth in claim 1 and wherein said first pole body includes a plurality of interconnected layers of magnetizable material and said second pole body includes a plurality of interconnected layers of magnetizable material which are spaced from the layers of said first pole body.

3. A movable element for use in a linear electric motor as set forth in claim 2 wherein a major side surface of one of the layers of said first pole body is disposed in the same plane as a major side surface of one of the layers of said second pole body.

4. A movable element for use in a linear electric motor as set forth in claim 1 wherein a second one of the magnetic poles of said first pole body extends through a third one of the openings in said holder means, a second one of the magnetic poles of said second pole body extends through a fourth one of the openings in said holder means, said first and third openings in said holder means being spaced apart by said predetermined distance, said second and fourth openings in said holder means being spaced apart by said predetermined distance.

5. A movable element for use in a linear electric motor as set forth in claim 1 further including:
   a first axle adjacent to said first pole body; and
   a second axle adjacent to said second pole body, said first and second axles having parallel longitudinal axes;
   said holder means including first axle retaining means for cooperating with said first pole body to hold said first axle against movement relative to said first pole body in a direction transverse to the longitudinal axis of said first axle, said holder means including second axle retaining means for cooperating with said second pole body to hold said second axle against movement relative to said second pole body in a direction transverse to the longitudinal axis of said second axle.

6. A movable element for use in a linear electric motor as set forth in claim 5 further including a plurality of wheels each of which is connected with an end portion of one of said axles.

7. A movable element for use in a linear electric motor as set forth in claim 6 further including:
   a first axle adjacent to said first pole body; and
   a second axle adjacent to said second pole body, said first and second axles having parallel longitudinal axes;
   said holder means including a first portion having a length which is less than the distance between the longitudinal axes of said axles and a second portion having a length which is greater than the distance between the longitudinal axes of said axles,
   said first axle being disposed between said first pole body and said second portion of said holder means,
   said second axle being disposed between said second pole body and said second portion of said holder means.

8. A movable element for use in a linear electric motor as set forth in claim 7 wherein:
   said first and second openings in said holder means extend through said first and second portions of said holder means,
   said first one of the magnetic poles of said first pole body extending through said first and second portions of said holder means at a location which is between parallel planes extending through the longitudinal axes of said axles in a direction perpendicular to a plane containing the longitudinal axes of said axles,
said first one of the magnetic poles of said second pole body extending through said first and second portions of said holder means at a location which is between the parallel planes.

* * * * *

UNITED STATES PATENT AND TRADEMARK OFFICE
CERTIFICATE OF CORRECTION

PATENT NO. : 4,694,209

DATED : September 15, 1987

INVENTOR(S) : Norikazu Shindou

It is certified that error appears in the above-identified patent and that said Letters Patent are hereby corrected as shown below:

Column 4, line 47, change "6" to --1--.

Signed and Sealed this

Second Day of February, 1988

Attest:

DONALD J. QUIGG

Attesting Officer

Commissioner of Patents and Trademarks